June 8, 1943.  H. K. BOURNE ET AL  2,321,178
HIGH PRESSURE MERCURY VAPOR DISCHARGE DEVICE
Filed May 2, 1941
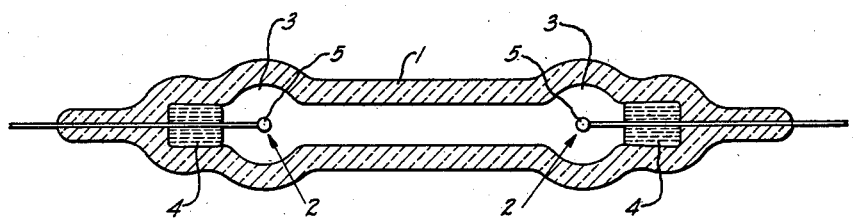
Inventors:
Harry Kebbell Bourne,
Leslie John Capp,
by John H. Anderson
Their Attorney.

Patented June 8, 1943

2,321,178

UNITED STATES PATENT OFFICE 2,321,178

HIGH PRESSURE MERCURY VAPOR DISCHARGE DEVICE

Harry Kebbell Bourne, Rugby, and Leslie John Capp, Daventry, England, assignors to General Electric Company, a corporation of New York Application May 2, 1941, Serial No. 391,580
In Great Britain October 14, 1940

3 Claims. (Cl. 176—122)

Our invention relates to high pressure metallic vapor discharge devices having vitreous envelopes such as shown for example by the Bol Patent 2,094,694. More particularly it relates to means for decreasing deterioration of such envelopes in the neighborhood of the electrodes.

High pressure metallic vapor electric discharge lamps of the type disclosed in the above-mentioned Bol patent usually comprise a small bore (of the order of a few millimeters diameter) quartz tube in which an arc operates between two electrodes protruding slightly from recesses at each end of the lamp. In a common form of such lamps the vapor is furnished by mercury pools positioned in the recesses and surrounding the electrodes. The heat of the arc during operation causes the pressure within the tube to build up to very high values which may be from 50 to 100 atmospheres. Under these conditions it is generally desirable to operate the lamp in a water cooled jacket. Although the tube will withstand this pressure satisfactorily when the lamp is new, failure of the tube sometimes occurs later in the life of the lamp. This may often be due to weakening of the quartz caused by devitrification under the heat of the arc. The devitrification starts at a point situated near the electrodes and once started it spreads gradually along the arc tube. It not only causes the tube to become weak but also tends to interfere with the transmission of light.

It is an object of our invention to provide a tube of the aforesaid type which shall be relatively free of devitrification. Further objects and advantages of our invention will be apparent from the following detailed description and the accompanying drawing showing a lamp constructed in accordance with the invention.

According to the invention this devitrification is decreased by providing enlarged chambers, in which the electrodes are located, in the ends of the tube so that the electrodes are situated further away from the walls of the tube. Such chambers have not been entirely satisfactory with lamps in which the electrodes surrounded by the mercury pool are bare or unactivated since there is an excess amount of cooling resulting from the enlarged chamber. This cooling makes it difficult to warm the lamps during the starting operation and as a result in some cases the lamps can not be started at all without special heating and starting means. We have found that this can be remedied by providing the electrode tips with an extended surface such as a ball. Apparently such construction helps to conserve heat and thus permit the lamp to heat up properly.

A suitable shape for these chambers is shown in the single figure of the accompanying drawing in which the arc tube 1 is shaped at each end in such a manner that the end of the electrode 2 is situated in a chamber 3, so that the walls are further away from the electrode and therefore less subject to the devitrifying effect of the arc. In this form of lamp it is essential that the condensed vapor is retained in the ends of the lamp. As shown, the electrodes are provided with ball tips or projections 5. These also aid in the retention of the condensed mercury vapor in the end chamber 4.

What we claim as new and desire to secure by Letters Patent of the United States is:

1. A high pressure mercury vapor discharge device of the type adapted to operate at pressures materially in excess of several atmospheres comprising a sealed elongated tubular quartz envelope have a diameter of the order of several millimeters, enlarged bulbous chambers adjacent the ends of said envelope, lead-in conductors sealed in and extending through the ends of said envelope into said chambers and terminating in electrodes positioned substantially centrally in said chambers, reduced end condensation chambers located between said bulbous chambers and the seal between the lead-in conductors and the envelope, and mercury pools retained in the said end condensation chambers around said lead-in conductors and in close proximity to said electrodes.

2. A high pressure mercury vapor discharge device of the type adapted to operate at pressures materially in excess of several atmospheres comprising a sealed elongated tubular quartz envelope having a diameter of the order of several millimeters, enlarged bulbous chambers adjacent the ends of said envelope, lead-in conductors sealed in and extending through the ends of said envelope into said chambers and terminating in electrodes positioned substantially centrally in said chambers, reduced end condensation chambers located between said bulbous chambers and the seal between the lead-in conductors and the envelope, said electrodes having end portions of extended area, and mercury pools retained in the ends of said envelope around said lead-in conductors and in close proximity to said electrodes.

3. A high pressure mercury vapor discharge device of the type adapted to operate at pressures materially in excess of several atmospheres comprising a sealed elongated tubular quartz envelope having a diameter of the order of several millimeters, enlarged bulbous chambers adjacent the ends of said envelope, lead-in conductors sealed in and extending through the ends of said envelope into said chambers and terminating in electrodes positioned substantially centrally in said chambers, reduced end condensation chambers located between said bulbous chambers and the seal between the lead-in conductors and the envelope, said electrodes having end portions of ball-like shape, and mercury pools retained in the said end condensation chambers around said lead-in conductors and in close proximity to said electrodes.

HARRY KEBBELL BOURNE.
LESLIE JOHN CAPP.

CERTIFICATE OF CORRECTION.

Patent No. 2,321,178. June 8, 1943.

HARRY KEBBELL BOURNE, ET AL.

It is hereby certified that error appears in the printed specification of the above numbered patent requiring correction as follows: Page 1, second column, line 50, claim 2, for "ends of said envelope" read --said end condensation chambers--; and that the said Letters Patent should be read with this correction therein that the same may conform to the record of the case in the Patent Office.

Signed and sealed this 12th day of October, A. D. 1943.

Henry Van Arsdale,
Acting Commissioner of Patents.

(Seal)